Patented May 21, 1940

2,201,927

UNITED STATES PATENT OFFICE 2,201,927

METHYLOL UREA ETHERS AND PROCESS FOR MAKING SAME

Ben E. Sorenson, Upper Darby, Pa., assignor to E. I. du Pont de Nemours & Company, Wilmington, Del., a corporation of Delaware No Drawing. Application December 17, 1937, Serial No. 180,456

5 Claims. (Cl. 260—553)

This invention relates to the production of crystalline urea derivatives and more particularly to the production of alkyl and aryl ethers of methylol ureas.

It has previously been proposed to prepare alkyl and aryl ethers of methylol ureas by reacting the dry methylol ureas with alcohols in the presence of an acid condensing agent or catalyst and immediately upon the disappearance of the methylol urea as a solution in the alcohol, neutarilizing the acid with a suitable alkali. The yields, however, have been unsatisfactorily low, and the previously used method is accompanied by a further disadvantage, namely, the formation in many instances of undue amounts of resinous products which cannot be readily or satisfactorily removed from the crystalline methylol urea ether.

It is therefore the principal object of this invention to provide a means of producing crystalline ethers of methylol ureas substantially free from resinous by-products and with materially increased yields. A further object is the production of certain ethers of methylol urea. Other objects will appear hereinafter.

These and other objects which will be apparent as the description of the invention proceeds are accomplished by reacting alcohols with methylol compounds wet with water in the presence of an acid catalyst and after the reaction has been completed neutralizing the acid catalyst with a suitable alkali.

The following examples are illustrative of the methods used in carrying out my invention:

Example I

Dimethylol urea di-isobutyl ether

One hundred and forty grams of dimethylol urea wet with water to the extent of 30% were ground to a smooth paste by any suitable means with 600 grams of isobutyl alcohol. The paste was placed in a one liter flask suitably equipped with a mechanical stirrer and thermometer. One-half cc. of a 50% solution of phosphoric acid in isobutyl alcohol was added to the contents of the flask and the flask then heated to between 55 and 60° C. with constant stirring until all the solid dimethylol urea disappeared and the entire contents of the flask was in liquid form. The time of heating was approximately ½ to 1 hour. Alcoholic sodium hydroxide was then added to the liquid to neutralize the acid catalyst, phenolphthalein being used as the indicator. The cloudy neutralized solution was filtered and the filtrate evaporated to dryness in shallow pans at room temperature.

The yield of crude diether obtained was 164 grams or 85% of the theoretical yield based on the dimethylol urea used.

Smaller ratios of alcohol to methylol urea may be used but in such cases lower yields of the crystalline diether are obtained.

The crude material may be purified by recrystallizing from diethyl ether. Such a material has a melting point of 81-82° C.

Example II

Dimethylol urea dinormal butyl ether

Example I was repeated using normal butyl alcohol in place of isobutyl alcohol the quantities in each instance being the same. In place of evaporating to dryness the filtered solution, the dimethylol urea dinormal butyl ether was isolated by chilling the solution to approximately from 0 to −10° C. and keeping at this temperature for approximately two hours after which the mass was filtered. The yield obtained was approximately 50% of the theoretical and the product had a melting point of 91° C.

Example III

Dimethylol urea disecondary butyl ether

Dimethylol urea (30% water wet) grams 143
Secondary butyl alcohol do 500
Hydrochloric acid (concentrated) cc 0.1

The procedure described under Example I was used. The crude material obtained was recrystallized from ethyl ether and the crystallized material had a melting point of 117-120° C. (uncorrected).

The crude material may also be recrystallized from secondary butyl alcohol.

Example IV

Dimethylol urea diisopropyl ether

Dimethylol urea (30% water wet) grams 860
Isopropyl alcohol do 3000
Hydrochloric acid (concentrated) cc 1

In preparing this diether the procedure described under Example I was used. The crude material obtained was recrystallized from a concentrated aqueous solution. The melting point of the purified material was 113-113.5° C. (uncorrected).

Example V

Dimethylol urea dimethyl ether

| | |
|---|---|
| Dimethylol urea (30% water wet) grams | 1430 |
| Methyl alcohol do | 2000 |
| Hydrochloric acid (concentrated) cc | 1 |

This diether was prepared according to the procedure described under Example I to the point of isolating the diether. After the solution was filtered it was concentrated under vacuum and the concentrated solution chilled to approximately minus 10° C. in order to crystallize the diether. The yield obtained was 58% of the theoretical based on the dimethylol urea used and the product had a melting point of 101° C.

Example VI

Monomethylol urea isobutyl ether

| | |
|---|---|
| Monomethylol urea (8% water wet) grams | 800 |
| Isobutyl alcohol do | 3000 |
| Hyrochloric acid (concentrated) cc | 2 |

The monomethylol urea was ground to a fine powder and then stirred into the isobutyl alcohol. The mixture was placed in a 5 liter flask which was suitably equipped with a stirrer and a thermometer. Stirring of the mass was started and the hydrochloric acid added. The mass was then heated to between 35 and 55° C. until the solid material had dissolved. The time necessary for solution was approximately 1 hour. The solution was then neutralized with alcoholic sodium hydroxide solution and the slightly cloudy liquid filtered. The filtrate was then evaporated in shallow pans at room temperature after which a heavy crystalline mush was obtained. This mush was then filtered by suction to obtain the crude material. The crude material was then recrystallized from a concentrated aqueous solution by chilling as in Example V. Further purification by recrystallizing from methyl alcohol by chilling to minus 10° C. for approximately 2 to 3 hours yielded a product having a melting point of 99-101° C.

Example VII

Monomethylol urea normal butyl ether

| | |
|---|---|
| Monomethylol urea (8% water wet) grams | 325 |
| Normal butyl alcohol do | 1500 |
| Hyrochloric acid (concentrated) cc | 0.5 |

This product is prepared according to the procedure described under Example VI. The product as purified from methyl alcohol had a melting point of 76-79° C.

While the methylol ureas in the examples are noted as being wet with water to the extent of 8 and 30% it has been found that the methylol ureas may conveniently be wet with water to the extent of from 5 to 40% to yield the improvement obtained by the present process. The methylol ureas may contain as much as 50% water. Greater quantities, however, are not considered to be practical from an economic standpoint. When methylol ureas containing appreciably less than 5% of water are used the yield of the diether is materially reduced and considerably quantities of resinous bodies are formed which interfere with the isolation of any ether formed so that in many cases the ether cannot be isolated.

The aryl ethers of monomethylol and dimethylol urea such as the benzyl, etc. ethers may also be produced to advantage by the present procedure.

The principal advantage of my new process is the improved yield of the ether obtained. Further the process reduces and in many instances eliminates for all practical purposes the formation of resinous bodies during the course of the reaction so that the crystalline ethers can be readily isolated free from contamination of the resinous material. The method is particularly adaptable to the preparation of the iso and secondary ethers of the methylol ureas, which ethers cannot be practically produced where dry methylol ureas are used. In addition to the economic advantage of increased yield of the crystalline ethers the process affords the added economic advantage of making it possible to eliminate the drying operation necessary in the prior art where the dry methylol ureas are used. A still further advantage is the production of the ethers of monomethylol urea which cannot be practically produced by the procedures where dry methylol urea is used.

The ethers of dimethylol urea as described herein yield upon heat treatment resinous products which are useful in the preparation of coating compositions.

As many apparently widely different embodiments of this invention may be made without departing from the spirit and scope thereof, it is to be understood that I do not limit myself to the specific embodiments thereof except as defined in the appended claims.

I claim:

1. A process for preparing an ether of a methylol urea which comprises reacting in the presence of an acid catalyst methylol urea wet with water to the extent of at least 5% with a saturated monohydric alcohol in which the alcoholic hydroxyl group is attached through acyclic carbon to a hydrocarbon radical, said alcohol being selected from the class consisting of aryl alcohols and normal, secondary and iso aliphatic alcohols, and neutralizing the acid catalyst after substantial completion of the reaction.

2. The process set forth in claim 1 in which said urea is monomethylol urea.

3. The process set forth in claim 1, in which said urea is dimethylol urea.

4. Monomethylol urea isobutyl ether.

5. Monomethylol urea normal butyl ether.

BEN E. SORENSON.